United States Patent [19]
Murray

[11] Patent Number: 4,763,945
[45] Date of Patent: Aug. 16, 1988

[54] TAILGATE TRACK MAT

[76] Inventor: Michael G. Murray, 9308 Warren St., Silver Spring, Md. 20910

[21] Appl. No.: 45,471

[22] Filed: May 4, 1987

[51] Int. Cl.⁴ .............................................. B62D 33/02
[52] U.S. Cl. ................................. 296/57 R; 296/39 R
[58] Field of Search ............... 296/50, 57 R, 61, 39 R; 16/250, 251

[56] References Cited

U.S. PATENT DOCUMENTS

| | | | |
|---|---|---|---|
| 2,258,447 | 10/1941 | Fairbanks | 296/57 R |
| 3,544,155 | 12/1970 | Gardner | 296/57 R |
| 3,881,768 | 5/1975 | Nix | 296/39 R |

Primary Examiner—Robert R. Song
Attorney, Agent, or Firm—Brady, O'Boyle & Gates

[57] ABSTRACT

A tailgate track mat for preventing sand, dirt, gravel and other granular material from accumulating in the gap or track between the end of a truck bed and its tailgate, wherein the mat includes a resilient flexible strip of material extending over the track and transversely of the truck bed and tailgate, and having one edge fastened to the tailgate and the opposite edge engaging the bed of the truck.

6 Claims, 1 Drawing Sheet

TAILGATE TRACK MAT

BACKGROUND OF THE INVENTION

Pick-up trucks are employed for light hauling of various construction materials such as sand, dirt, gravel and the like. This granular material has a tendency to become lodged in the gap or track between the end of the truck bed and tailgate, and, unless this track is kept clean, the normal operation of the tailgate will be hampered resulting in permanent damage to the tailgate and its associated hinge.

In order to maintain the cleanliness of a pick-up truck bed, it has been proposed to provide the truck bed with a molded plastic liner of the type shown in U.S. Pat. No. 3,881,768 which includes a tailgate panel portion integrally connected to the bed liner portion by a thin web hinge. This type of liner has not proven entirely satisfactory for its intended purpose since the plastic hinge portion between the bed liner and tailgate panel portion breaks after repeated opening and closing of the tailgate resulting in dirt and gravel once again gravitating into the track.

After considerable research and experimentation, the tailgate track mat of the present invention has been devised which comprises, essentially, a strip of rubber having a reinforcing webbing of high impact Nylon extending over the tailgate track and transversely of the truck bed and tailgate. One edge of the strip is fastened to the inner face of the tailgate near the lower edge portion thereof, and the opposite edge of the strip is provided with a magnetic strip for releasably holding the strip against the bed of the truck. By this construction and arrangement, a hinged sill is provided to prevent dirt and other debris from becoming lodged in the gap or track between the truck bed and tailgate.

DESCRIPTION OF THE PREFERRED EMBODIMENTS

Figure 3:
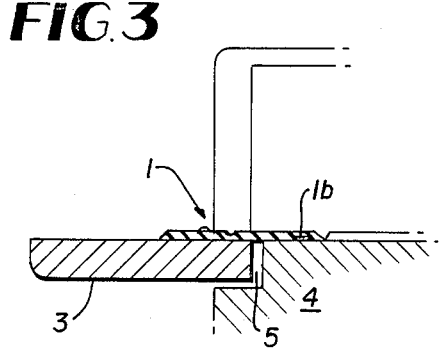
FIG. 3 is a view taken along line 3—3 of FIG. 1.
Figure 4:
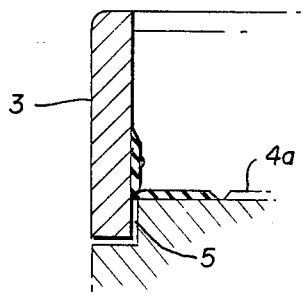
FIG. 4 is a side elevational view, in section, of the mat shown in FIGS. 1 and 3 with the tailgate in the closed position.
Figure 5:
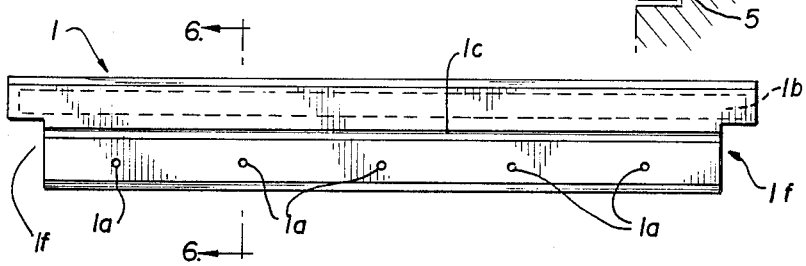
FIG. 5 is a top plan view of the mat shown in FIGS. 1 and 3.
Figure 6:
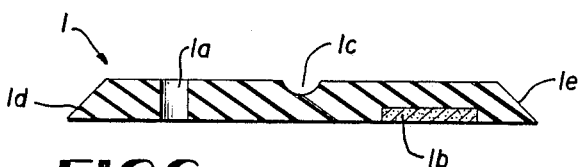
FIG. 6 is a view taken along lines 6—6 of FIG. 5.

Referring to the drawing, and more particularly to FIGS. 1, 3, 5 and 6, the mat 1 of the present invention comprises a strip of resilient, flexible material such as rubber having a reinforcing webbing of high impact Nylon, and having a plurality of apertures 1a provided therein along one edge portion thereof whereby the strip can be fastened by suitable screws 2 to the inner face of the pick-up truck tailgate 3 along the lower edge portion thereof. A strip of magnetic material 1b is embedded into the bottom surface of the strip 1 and extends the length of the strip along the opposite edge portion thereof, the magnetic strip 1b being engageable with the flat end portion of the truck bed 4. A longitudinally extending groove or recess 1c is provided in the upper surface of the strip substantially intermediate the edge portions thereof to provide a hinge for the mat to facilitate its pivotal movement between the open and closed positions of the tailgate 3, as shown in FIGS. 3 and 4.

To complete the structure of the mat 1, the edge portions are bevelled as at 1d and 1e to facilitate the sweeping of debris from the bed, and cut-out portions 1f are provided on each end of the strip to accommodate the strip to the configuration of the truck bed.

In use, the mat 1 is secured to the tailgate 3 and extends over the gap or track 5 between the tailgate and the end of the truck bed. The magnetic strip 1b holds the strip against the truck bed but allows the respective edge portion of the mat to slide on the bed during the opening and closing of the tailgate 3 as shown in FIGS. 3 and 4.

The mat 1, described in connection with FIGS. 1, 3, 5 and 6, is adapted for use in pick-up trucks manufactured by the Ford Motor Company wherein the conventional reinforcing ribs 4a of the bed do not extend the full length of the bed but rather terminate short of the bed end, substantially three inches, leaving a flat surface for the magnetic strip to engage.

Figure 1:
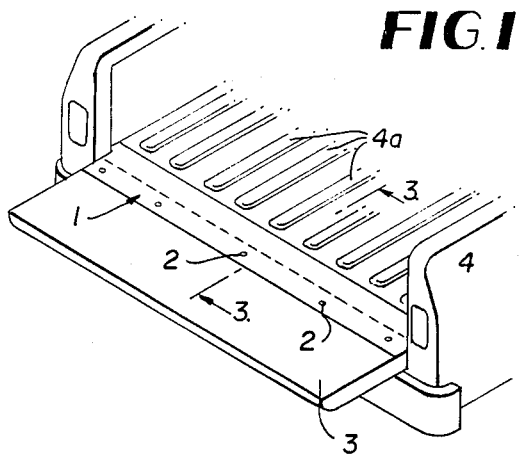
FIG. 1 is a perspective view showing one embodiment of the mat of the present invention mounted on the bed of one model of a pick-up truck.
Figure 2:
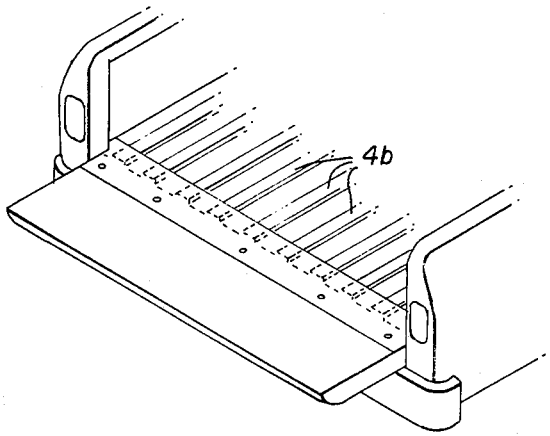
FIG. 2 is a perspective view showing another embodiment of the mat of the present invention mounted on the bed of another model of a pick-up truck.
Figure 8:
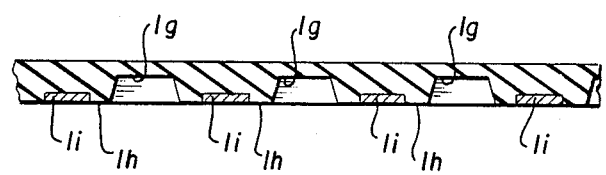
FIG. 8 is a view taken along line 8—8 of FIG. 7.
Figure 7:
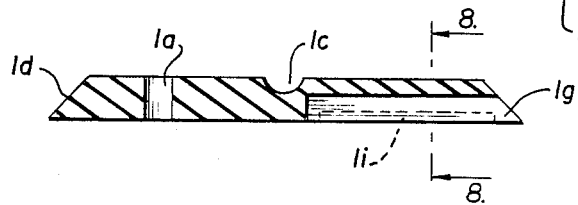
FIG. 7 is a sectional side elevational view of the mat shown in FIG. 2.

In other pick-up truck models, such as those manufactured by the General Motors Corporation, as shown in FIG. 2, the reinforcing ribs 4b extend the full length of the bed. To accommodate the mat of the present invention for this pick-up truck model, the lower surface of the mat, as shown in FIGS. 7 and 8, is provided with a plurality of spaced, parallel grooves 1g and lands 1h corresponding to the ribs and adjacent grooves, respectively, in the truck bed, whereby the bed ribs 4b will be received in the mat grooves 1g and the mat lands 1h will be received in the bed grooves, a magnetic strip 1i being embedded into each of the lands 1h.

From the above description, it will be appreciated by those skilled in the art that the tailgate track mat of the present invention provides an effective mat to prevent debris from becoming lodged in the tailgate track. It can be easily installed by the vehicle dealer or owner and since the mat is fixedly attached only to the tailgate, removal of the tailgate for converting the pick-up truck to a truck camper, or installation of a fifth wheel for converting the pick-up truck for use as an articulated vehicle are not effected by installation of the tailgate track mat.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A tailgate track mat for preventing sand, dirt, gravel and other granular material from accumulating in the gap between the end of a truck bed and its tailgate, comprising a strip of material extending over the gap and transversely of the truck bed and tailgate, means attaching one edge portion of the strip to the tailgate in proximity to the lower edge portion thereof, the opposite edge portion of the strip engaging the bed of the truck and magnetic means embedded in said strip on the bottom surface thereof adjacent said opposite edge portion for holding the strip against the bed of the truck.

2. A tailgate track mat according to claim 1, wherein the lower surface of the mat adjacent said opposite edge portion is provided with a plurality of spaced, parallel grooves and lands corresponding to the reinforcing ribs and adjacent grooves, respectively, in the truck bed, whereby the bed ribs are received in the mat grooves and the mat lands are received in the bed grooves.

3. A tailgate track mat according to claim 1, wherein the material comprises a strip of rubber having a reinforcing webbing of high impact Nylon.

4. A tailgate track mat according to claim 3, wherein a longitudinally extending recess is provided in the upper surface of the strip substantially intermediate the edge portions thereof, to thereby provide a hinge for the mat to facilitate its pivotal movement between the open and closed positions of the tailgate.

5. A tailgate track mat for preventing sand, dirt, gravel and other granular material from accumulating in the gap between the end of a truck bed and its tailgate, comprising a strip of material extending over the gap and transversely of the truck bed and tailgate, means attaching one edge portion of the strip to the tailgate in proximity to the lower edge portion thereof, and the opposite edge portion of the strip engaging the bed of the truck, the lower surface of the mat adjacent said opposite edge portion having a plurality of spaced, parallel grooves and lands corresponding to the reinforcing ribs and adjacent grooves, respectively, the truck bed, whereby the bed ribs are received in the mat grooves and the mat lands are received in the bed grooves, and magnetic means embedded into each of said lands for holding the strip against the bed of the truck.

6. A tailgate track mat for preventing sand, dirt, gravel and other granular material from accumulating in the gap between the end of the truck bed and its tailgate, comprising a strip of rubber having a reinforcing of webbing of high impact nylon extending over the gap and transversely of the truck bed and tailgate, means attaching one edge portion of the strip to the tailgate in proximity to the lower edge portion thereof, the opposite edge portion of the strip engaging the bed of the truck, a longitudinally extending recess being provided in the upper surface of the strip substantially intermediate the edge portion thereof, to thereby provide a hinge for the mat to facilitate its pivotal movement between the open and closed positions of the tailgate, and the edge portions of the strip being bevelled to facilitate the sweeping of debris from the bed.

* * * * *